United States Patent [19]

Wittren

[11] Patent Number: 4,640,094

[45] Date of Patent: Feb. 3, 1987

[54] FLOW AMPLIFYING STEERING SYSTEM

[75] Inventor: Richard A. Wittren, Cedar Falls, Iowa

[73] Assignee: Deere & Company, Moline, Ill.

[21] Appl. No.: 825,848

[22] Filed: Feb. 4, 1986

[51] Int. Cl.$^4$ .............................................. B62D 5/06
[52] U.S. Cl. ...................................... 60/385; 180/132
[58] Field of Search .................. 180/132; 60/385, 384, 60/386

[56] References Cited

U.S. PATENT DOCUMENTS 4,463,819 8/1984 Becker et al. ........................... 60/384
4,553,390 11/1985 Liebert et al. ....................... 180/132

Primary Examiner—John J. Love
Assistant Examiner—Donn McGiehan

[57] ABSTRACT

A power steering system having a hydraulic motor driven by fluid flow from a hand operated pump and a main pump. The hand pump provides input to a control valve which amplifies fluid flow to the hydraulic motor, with fluid from the main pump, in proportion to the flow rate through the hand pump. The degree of amplification is controlled by ports within the control valve which also serve to communicate hand generated fluid pressure to the hydraulic motor. The hand pump will also allow delivery of hand generated fluid pressure to the hydraulic motor in the event of a main hydraulic pump failure.

21 Claims, 3 Drawing Figures

FLOW AMPLIFYING STEERING SYSTEM

BACKGROUND OF THE INVENTION

1. Field of the Invention

This invention relates generally to a hydraulic steering system for a vehicle. More specifically, this invention relates to a hydraulic steering system having amplification of manually generated hydraulic pressure.

2. Description of the Prior Art

Hydraulic power steering systems generally consist of two types—hydromechanical systems and pure hydraulic power steering. This invention applies to the latter type.

In the past, pure hydraulic power steering systems provided the operator with little feel for the degree of turning taking place. Additional turning feedback was given to the operator by improving the input response to these systems. Input response was improved by using a hand operated steering pump to provide a low volume or signal flow of hydraulic fluid and amplifying the signal flow to power a hydraulic steering motor. Systems of this type are explained in SAE Papers 660238 and 720802. Amplification in these systems is provided by a control valve responsive to a pressure differential supplied by the hand operated steering pump.

U.S. Pat. No. 3,473,324 issued to Mercier shows a steering system in which the flow of fluid from the hand operated steering pump is combined with the main flow of hydraulic fluid to the hydraulically energized steering motor. It has also been taught by Baines in U.S. Pat. No. 3,463,260 and Harding in U.S. Pat. No. 3,589,465 to combine the hand generated flow of fluid with the main flow of hydraulic fluid within a control valve for flow amplification. Combining the signal flow of hydraulic fluid with the main hydraulic fluid flow increases the total amount of fluid flow into the hydraulic motor with a resulting increase in its responsiveness. In addition, these prior art references teach routing the fluid flow from the hand operated steering pump to the hydraulic motor as a means of providing emergency steering in the event of a main pump failure.

In order to further increase the responsiveness of the steering system and give the operator additional feedback on steering maneuvers, it is desirable to have the amount of amplification proportional to the input from the hand operating steering pump. U.S. Pat. No. 3,938,331 granted to Polacek et al teaches a pure hydraulic power steering system having proportionality between the flow rate of the main hydraulic pump and a hand operated steering pump. This proportionality is provided by flow meters and control valves external to the control valve for directing fluid flow to the hydraulic motor.

It is an object of this invention to provide a power steering system having a single control valve for proportionately amplifying fluid flow from a hand operated steering pump.

A further object of this invention is to combine hand generated fluid pressure and amplified fluid pressure in a single control valve for proportionately amplifying fluid flow.

It is a further object of this invention to provide a steering system that will facilitate manual steering operation in an emergency situation.

SUMMARY OF THE INVENTION

Accordingly, there is disclosed a hydraulic power steering system for a vehicle using a source of pressurized fluid, a fluid reservoir, a control valve, a bidirectional hydraulic steering motor and a bidirectional hand pump. The bidirectional hand pump delivers pressurized fluid to the control valve from one of two work ports corresponding to a selected turning direction. The control valve is connected to a source of pressurized fluid for amplifying a fluid input from the hand pump. The control valve consists of a housing with a central bore and a valve member located therein. The bore has a pair of chambers for receiving fluid flow from the bidirectional pump, a pair of supply inlets having uninterrupted fluid communication from the source, a pair of proportioning inlets in fluid communication with one of the work ports, and a pair of service outlets which supply fluid from the control valve to the hydraulic steering motor. The valve member has a pair of extended recesses in fluid communication with the supply inlets and a pair of proportioning recesses in fluid communication with the proportioning inlets. In response to pressure from the hand pump, the valve member is displaced by an amount proportional to the flow rate from the hand pump, toward one of the chambers into an operating position. In an operating position, one of the proportioning recesses and a corresponding extended recess communicate fluid from the hand pump and the source of pressurized fluid, respectively, to a service outlet. An increase in the flow rate through the proportioning recess increases the displacement of the valve member thereby increasing the flow rate of pressurized fluid from the source to the service outlet. Increased displacement of the valve member is caused by communication of the pressure drop across the proportioning recess to a corresponding chamber along the bore. Movement of the valve element to an operating position simultaneously connects a reservoir outlet along the bore with the other service outlets.

Other objects and embodiments of this invention include details of the steering system arrangement and components.

DETAILED DESCRIPTION OF THE PREFERRED EMBODIMENT

Figure 1:
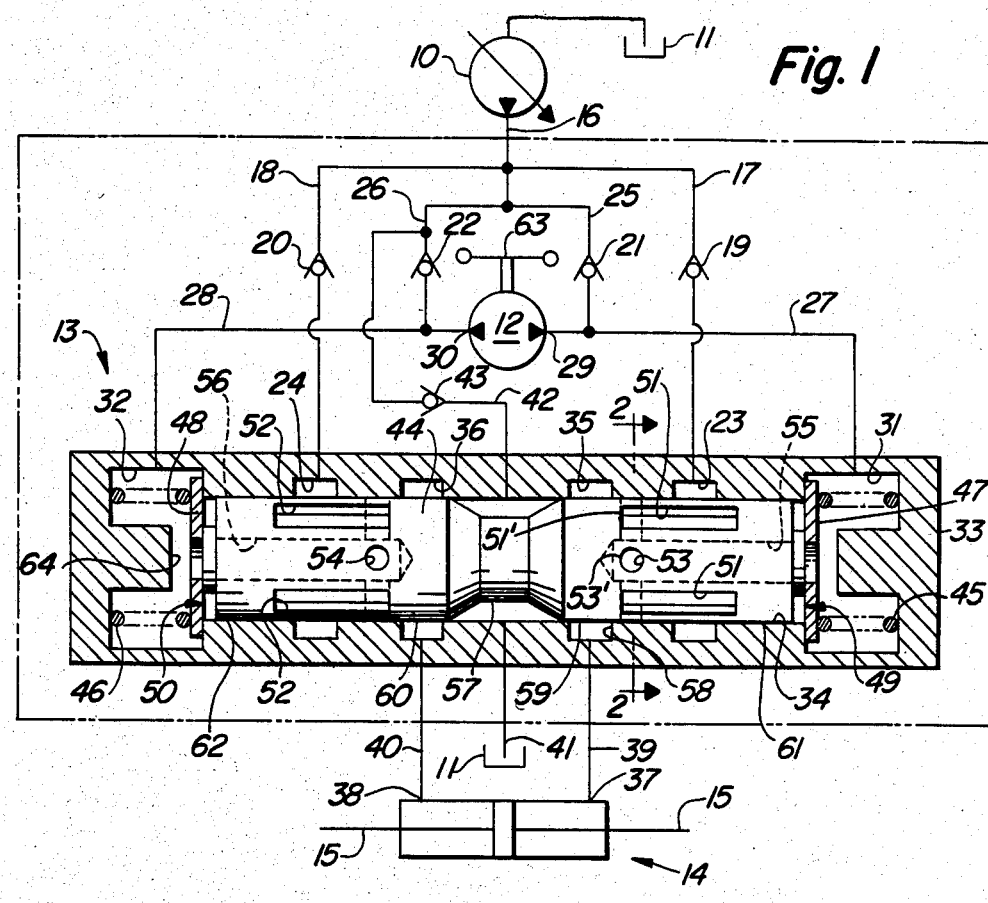
FIG. 1 is a schematic diagram of the power steering system of this invention.

The hydraulic power steering system of this invention as depicted in FIG. 1 consists of a main hydraulic pump 10 driven by a power source (not shown) which takes hydraulic fluid from a reservoir 11 and delivers it to a bidirectional hydraulic steering motor 14 in a manner regulated by bidirectional hand pump 12 and control valve 13. Main pump 10 and bidirectional hand pump 12 are of any typical construction well-known to those skilled in the art and control valve 13 is of a construction hereinafter explained in detail. Hydraulic motor 14 consists of a movable piston having double rods with rod ends 15 connected to a suitable steering arm and steering linkage (not shown). For convenience, certain symmetrical components of the power steering system will be described using left- and right-hand nomenclature corresponding to the position of these components in FIG. 1.

The interconnection between the pump 10, hand pump 12 and control valve 13 will be considered first. Pressurized fluid from pump 10 flows into supply line 16. Line 16 has a branch point connecting it to right supply port line 17 and left supply line 18. Supply lines 17 and 18 are respectively connected to right and left supply inlets in the control valve 13 with the right port consisting of an annular groove 23 and the left port consisting of an annular groove 24. Also positioned across lines 17 and 18 are check valves 19 and 20, respectively, which only permit fluid flow from pump 10 to the aforementioned supply inlets. Supply line 16 terminates at a branch connection to right and left hand pump lines 25 and 26. Hand pump lines 25 and 26 are connected across check valves 21 and 22, respectively, to right work port line 27 and left work port line 28. Check valves 21, 22 prevent circulation of fluid flow around the hand pump lines and from either hand pump line to pump 10.

Hand pump 12 has right and left work ports 29 and 30, respectively, connected to work port lines 27 and 28. These ports function as inlet/outlet ports with one port delivering pressurized fluid to one hand pump line while the other port takes in pressurized fluid from the opposite hand pump line. For example, when the pump is operated so that fluid flow is from the left- to the right-hand side of the pump, right work port line 27 provides pressurized fluid to the control valve while left work port line 28 takes fluid from either the control valve or left hand pump line 26. Right and left work port lines 27 and 28 are connected respectively to right and left chambers 31 and 32 of the control valve.

Control valve 13 consists of a main housing 33 in which previously referred to annular grooves 23, 24 and chambers 31, 32 are located. These grooves and chambers are connected to a central bore 34 located within housing 33. A valve member consisting of a spool 44 is slidably disposed within bore 34. FIG. 1 illustrates the control valve in a neutral position. Chamber 32 is located at the extreme left end of the bore and chamber 31 is at its extreme right end. Moving inward from the chambers along bore 34, annular grooves 23 and 24 are symmetrically located on respective right- and left-hand sides of the bore. Spaced further inward from annular grooves 23 and 24 is a pair of service outlets. These service outlets consist of a pair of symmetrically spaced recesses in the form of annular grooves 35 and 36 connected respectively to right and left load ports 37 and 38 of hydraulic motor 14 via right and left load port lines 39 and 40. At its center, bore 34 has a reservoir outlet connected to reservoir line 41 which empties into reservoir 11 and high pressure feedback outlet connected to a feedback line 42. Feedback line 42 is connected to left hand pump line 26 upstream of check valve 22. A check valve 43 is also provided on line 42 to prevent fluid flow from pump 10 to bore 34. Spool valve 44 is acted upon at its right and left sides by springs 45 and 46 located in chambers 31 and 32, respectively, with each spring contacting a spring plate 47, 48 and an outer wall of chamber in which it is located. Right and left ends 49 and 50 of the spool contact adjacent spring plates 47 and 48 which keep the spool centered within the bore. The periphery of spool 44 is also provided on opposite sides with sets of elongated grooves 51 and 52 on the right and left, respectively, which extend axially. A pair of lands 61 and 62 block the left and right chambers respectively from fluid communication with axial grooves 51 and 52. Axial grooves 51 and 52 are positioned to continually overlap annular grooves 23 and 24 respectively. Axial groove 51 overlaps annular service outlet groove 35 when the spool is shifted to the left and axial groove 52 overlaps annular service groove 36 when the spool is shifted to the right. At the center of the spool and separated from axial grooves 51 and 52 by lands 59 and 60, respectively, is a reservoir channel 57. This channel constantly communicates with outlet lines 41 and 42 and, when the spool is shifted right or left, will connect the service port groove 35 or 36 over which it is positioned with the reservoir and the high pressure feedback line. Proportioning recesses, shown as sets of ports 53 and 54, are located, respectively, on the left- and right-hand side of the spool. Pressurized fluid is supplied to port 53 through a blind axial bore 55 centered in spool 44. The open end of bore 53 communicates with housing chamber 31 and the blind end is connected to a radial passage forming port 53. On the opposite side of the spool valve, ports 54 are connected to chamber 32 by an internal bore 55, which is similar to bore 55.

Figure 2:
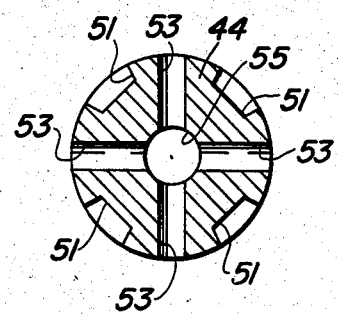
FIG. 2 taken along the line 2—2 of FIG. 1.

FIG. 2 shows a cross section of the spool valve across proportioning port 53 and axial groove 51. Axial groove set 51 consists of four grooves circumferentially and equally spaced about the periphery of spool valve 44. Four proportioning ports 53 extend to the outer surface of the spool valve 44 in sections between axial grooves 51. This arrangement is necessary to keep fluid flow through port 53 separate and distinct from the fluid supplied to axial groove 51. Separate and distinct flows are necessary to vary the amplification as explained later.

Figure 3:
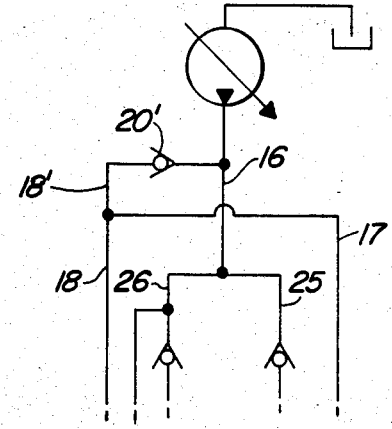
FIG. 3 an alternate arrangement for various lines of FIG. 1.

As apparent to those skilled in the art, the current control valve is designed as a closed center system. However, the line arrangement for supplying fluid from pump 10 would serve an open center system as well as the closed center system herein depicted. When the closed center system as herein described is used, the piping supply arrangement may be modified to eliminate a check valve as shown in FIG. 3. Referring then to FIG. 3, a main supply line 18' is shown branching from pump line 16 and connected to right and left supply lines 17 and 18 at its opposite end. In this case, separate check valves 19 and 20 have been eliminated and are replaced by a single check valve 20' which prevents backflow of fluid from either annular groove 23 or 24, through lines 17 or 18 respectively, to the pump 10.

MODE OF OPERATION

Looking then at the operation of the power steering system, the hand pump is operable to move the spool 44 of control valve 13 from the illustrated neutral position of FIG. 1 leftward to a left turn position or rightward to a right turn position. In the right turn position, control valve 13 directs fluid to one end of motor 14 and, in the left turn position, to an opposite end of motor 14.

In the absence of fluid flow from hand pump 12, the springs 45 and 46 keep spool 44 centered in the neutral position. In the neutral position, no fluid flow is permitted across the control valve. Communication of pressurized fluid from grooves 23 and 24 is prevented by lands 61 and 59 on opposite sides of right axial groove 51 and by lands 60 and 62 on opposite sides of left axial groove 52. Pressurized fluid is contained within chambers 31 and 32 by alignment of ports 53 and 54 with the face of bore 34. Finally, lands 59 and 60 are aligned with annular service grooves 35 and 36, respectively, to prevent fluid flow into or out of load ports 37 and 38, respectively.

In order to effect turning of the vehicle, the operator rotates wheel 63 of hand pump 12 in order to create, in this case, a fluid flow into port 30 to and out of port 29. As rotation of the wheel continues, fluid pressure is increased in chamber 31. This increase in pressure acts upon the right end 49 of spool 44 shifting the spool to the left. Movement of the spool leftward compresses spring 46 and pushes fluid out of chamber 32 which is returned, via left work port line 28, to port 30 which in this case acts as an inlet. Any additional fluid requirements of pump 12 will be supplied by pump 10 through line 26.

The continued flow of fluid to chamber 31 will eventually push leading edge 53' of port 53 beyond the adjacent edge 58 of annular service groove 35 and will position channel 57 over service groove 36. Thus, pressurized fluid flows from port 53 through groove 35, line 39, and port 37, into the motor 14 and out of motor port 38 through line 40, groove 36 and into reservoir 11. Leftward movement of spool valve 44 will continue until, ports 53 have been pushed far enough past edge 58 to create a steady state pressure drop condition such that hand pump generated pressure in chamber 31 is balanced by the force of spring 46, or spring plate 49 contacts end stop 64 at the left end of the housing. Thus, the variable flow area or restriction provided by the interaction of port 53 and edge 58 allows a variation in the displacement of the spool valve which is proportional to the flow rate from hand pump 12. In addition, as the valve moves to the left, axial groove 51 will at some point overlap annular service groove 35. Overlapping of the grooves 51 and 35 will allow pressurized fluid from pump 10 to be supplied to left load port 37 of hydraulic motor 14. The amount of fluid flow from axial groove 51 to groove 35 will be proportional to the amount of overlapping. Thus, ports 53 control the amount of leftward spool displacement and the amount of groove overlapping thereby regulating the volumetric rate of fluid supplied to hydraulic motor 14 from pump 10. In this example, leading edges 53' of ports 53 are aligned with the inward edge 51' of groove 51 such that both grooves simultaneously come in contact with edge 58 of annular service groove 55. However, this alignment may be varied as desired such that the addition of hydraulic fluid from pump 10 to the hydraulic motor precedes or lags the addition of hydraulic fluid from the hand pump 12. It is also possible to vary the shape or axial spacing of port 53 in order to increase the rate or alter the ratio of flow addition from pump 10.

The spool valve will remain in a leftward position as long as fluid continues to flow across the hand pump into port 30 and out of port 29. As fluid flow across the hand pump diminishes, the pressure drop across port 53 and the corresponding pressure in chamber 31 decreases. Shortly after fluid flow across hand pump 12 has stopped, pressure equalizes in chambers 31 and 32 so that spool valve 44 returns to its center or neutral position.

Steering is effected in the opposite direction by turning the hand pump wheel 63 to create fluid flow into port 29 and out of port 30 across the hand pump. The pressure differential created by the hand pump causes the spool valve to move rightward in a manner analogous to that previously described such that hydraulic motor 14 will move in an opposite direction.

All of the recesses, grooves, ports and chambers that are to supply fluid to the steering motor for a given turning direction can be referred to as corresponding. Thus, service groove 35, axial groove 51, port 53, supply groove 23 and chamber 31 are corresponding in that these elements cooperate to supply fluid to load port 37. The same correspondence applies to elements on the left hand side of the control valve 13.

Hand pump 12 can also provide emergency fluid pressure to hydraulic motor 14 in the event of a failure of main pump 10. If hydraulic pump 10 fails, the operator can still maneuver the vehicle by turning hand wheel 63 of the hydraulic pump. For example, if the hand pump 12 is turned to produce a flow of fluid into port 30 and out of port 29, fluid flow is prevented from bypassing valve 13 and motor 14 by check valve 21. Fluid pressure in chamber 31 is again increased causing spool valve 44 to shift leftward and fluid to flow through port 53 to load port 37 of hydraulic motor 14. Once the spool valve is shifted leftward the fluid pressure will also be communicated to supply groove 23 across axial groove 51. However, fluid flow out groove 23 through line 17 is prevented by check valve 19. In an emergency situation, the supply line configuration of FIG. 1 offers an advantage over the supply line configuration of FIG. 3 since the additional check valve prevents backflow of fluid into annular groove 24 which would be otherwise permitted by the line configuration of FIG. 3. Eliminating fluid pressure to annular groove 24 reduces the leakage potential of the system and makes more fluid available to effect the turning operation.

Although this invention has been described in relation to a specific embodiment, it is not to be limited thereby and encompasses all variations and modifications within the scope of the appended claims.

I claim:

1. A power steering system for a vehicle including a source of pressurized fluid, a fluid reservoir, a bidirectional hydraulic steering motor, a bidirectional hand pump having first and second work ports, and a control valve providing flow amplification of the output from said bidirectional pump, said control valve comprising:

a valve housing having a central bore, means for defining first and second chambers along said bore, said chambers having fluid communication with said first and second work ports respectively, first and second supply inlets along said bore in fluid communication with said source, first and second service outlets along said bore, each outlet in fluid communication with an opposing fluid inlet of said motor, first and second hand pump inlets along said bore in fluid communication with said first and second work ports respectively and a reservoir outlet in fluid communication with said reservoir;

a valve member movably located within said bore having first and and second extended recesses in fluid communication with said first and second supply inlets respectively, first and second proportioning recesses in fluid communication with said first and second hand pump inlets respectively, a reservoir channel, first and second lands for blocking fluid flow to or from said first and second service outlets respectively, a third land for blocking fluid communication between said first hand pump inlet and said first supply inlet, and a fourth land for blocking fluid communication between said second hand pump inlet and said second supply inlet;

means for communicating fluid pressure in said first and second proportioning recesses to said first and second chambers respectively;

means for maintaining said valve member in a neutral position in the absence of fluid flow from said bidirectional hand pump wherein said first and second lands block fluid flow to or from said service outlets; and means for moving said valve member to an operative position in proportional response to a difference in pressure between said chambers where in said operating position one of said service outlets is in fluid communication with its corresponding proportioning and extended recesses and the other of said service outlets is in fluid communication with said reservoir outlet across said reservoir channel.

2. The power steering system of claim 1 wherein said chambers have uninterrupted fluid pressure from said source.

3. The power steering system of claim 1 wherein said first and second work ports are in fluid communication with said first and second chambers respectively.

4. The power steering system of claim 3 wherein said work ports have uninterrupted communication of fluid pressure from said source.

5. The power steering system of claim 1 wherein said valve member comprises a spool separating opposite ends of said bore and defining said chambers at opposite ends of said bore.

6. The power steering system of claim 5 wherein each of said chambers contain a spring, positioned between said spool and the opposite wall of said chamber for maintaining said spool valve in a neutral position.

7. The power steering system of claim 6 wherein said spool valve is in a neutral position when centered in said bore by said springs.

8. The power steering system of claim 1 wherein fluid pressure in said first or second chambers acts on said valve member to move said member to an operative position.

9. The power steering system of claim 3 wherein said proportioning inlets are in communication with corresponding chambers and said valve member has internal passageways connecting said chambers with a corresponding proportioning recesses to deliver pressurized fluid from said work ports to said recesses and communicate fluid pressure from said recesses to said chambers.

10. The power steering system of claim 8 wherein said service outlets comprise annular grooves about said bore and said corresponding proportioning and extended recesses have leading edges adjacent to and aligned with said annular grooves to simultaneously establish fluid communication therewith when said valve member is moved into operating position.

11. The power steering system of claim 1 wherein said bidirectional hand pump has uninterrupted communication of fluid pressure from said source and a check valve prevents fluid flow from each work port of said bidirectional hand pump to said source.

12. The power steering system of claim 1 wherein one or more check valves prevent fluid flow from said supply inlets to said source.

13. A power steering system for a vehicle comprising a source of pressurized fluid, a fluid reservoir, a bidirectional hydraulic motor, a bidirectional hand pump having first and second work parts and a control valve providing flow amplification of the output from said bidirectional pump, said control valve comprising:

a valve housing having a central bore therein, first and second supply inlets along said bore in fluid communication with opposite sides of said hydraulic motor, first and second work port inlets along said bore in fluid communication with said first and second work ports respectively and a reservoir outlet along said bore in fluid communication with said reservoir;

a spool located within said bore defining first and second chambers at opposite ends of said bore in fluid communication with said first and second work port inlets respectively, said spool having first and second axially extended recesses in fluid communication with said first and second supply inlets respectively, first and second proportioning ports on its periphery, a first internal passageway establishing fluid communication between said first chamber and said first proportioning port, a second internal passageway establishing fluid communication between said second chamber and said second proportioning port, first and second lands for blocking fluid communication to or from said first and second service outlets respectively, a third land for blocking fluid communication between said first work port inlet and said first supply inlet and a fourth land for blocking fluid communication between said second work port inlet and said second supply inlet, and a reservoir channel in fluid communication with said reservoir outlet;

means for maintaining said spool in a neutral position in the absence of fluid flow from said bidirectional hand pump, wherein said first and second lands block fluid flow to or from said service outlets; and means for moving said spool in proportional response to a pressure difference between said chambers, where in said operating position one of said service outlets is in fluid communication with its corresponding proportioning port and recess and the other of said service outlets is in fluid communication with said reservoir channel.

14. The power steering system of claim 13 wherein said passageways comprise central blind bore in said spool open at one end to one of said chambers and connected by a radial passageway to a corresponding proportioning port at its opposite end.

15. The power steering system of claim 14 wherein said spool is in the center of said bore in said neutral position and is centered by a pair of springs, each spring acting against an end of said spool and an opposing wall of said chamber.

16. The power steering system of claim 15 wherein said supply inlets and service outlets comprise annular grooves.

17. The power steering system of claim 16 wherein said first and second chambers have uninterrupted communication of fluid pressure from said source.

18. The power steering system of claim 17 wherein said bidirectional pump has uninterrupted communication of fluid pressure from said source.

19. The power steering system of claim 18 wherein a check valve prevents fluid flow from said supply inlets to said source.

20. The power steering system of claim 18 wherein said first and second supply inlets are connected to said source by separate passageways, each passageway having a check valve preventing fluid flow from said inlet to said source.

21. The power steering system of claim 20 wherein said first and second work ports are connected to said source by separate passageways, each passageway having a check valve preventing fluid flow from said work port to said source.

* * * * *